(12) United States Patent
Rao Krishnagi et al.

(10) Patent No.: US 12,184,722 B2
(45) Date of Patent: Dec. 31, 2024

(54) METHOD AND SYSTEM FOR PERSISTING SESSION DATA

(71) Applicant: JPMorgan Chase Bank, N.A., New York, NY (US)

(72) Inventors: Kumar Rao Krishnagi, Powell, OH (US); Matthew J Porter, Mechanicsburg, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 17/457,056

(22) Filed: Dec. 1, 2021

(65) Prior Publication Data

US 2023/0171308 A1  Jun. 1, 2023

(51) Int. Cl.
*H04L 67/1027* (2022.01)
*H04L 67/148* (2022.01)

(52) U.S. Cl.
CPC ........ *H04L 67/1027* (2013.01); *H04L 67/148* (2013.01)

(58) Field of Classification Search
CPC .......................... H04L 67/1027; H04L 67/148
See application file for complete search history.

(56) References Cited

U.S. PATENT DOCUMENTS

| | | | |
|---|---|---|---|
| 6,385,642 B1 * | 5/2002 | Chlan | H04L 67/06 709/227 |
| 10,305,850 B1 * | 5/2019 | Aziz | G06Q 50/01 |
| 2019/0327312 A1 * | 10/2019 | Gupta | H04L 67/148 |
| 2021/0144216 A1 * | 5/2021 | Enat | H04L 67/148 |
| 2024/0028611 A1 * | 1/2024 | Mátray | H04L 67/1097 |

\* cited by examiner

*Primary Examiner* — Ryan J Jakovac
(74) *Attorney, Agent, or Firm* — Greenblum & Bernstein, P.L.C.

(57) ABSTRACT

A method for facilitating session data persistence and management is disclosed. The method includes receiving a first indication from an application, the first indication relating to an initiation of a first session; compiling session data from the application, the session data relating to a state of the application; receiving a termination indication from the application, the termination indication relating to a termination of the first session; persisting, in a session cache, the session data based on the termination indication; receiving a second indication from the application, the second indication relating to an initiation of a second session; identifying the corresponding session data in the session cache by using the second indication; and automatically injecting the identified session data into the application.

18 Claims, 5 Drawing Sheets

METHOD AND SYSTEM FOR PERSISTING SESSION DATA

BACKGROUND

1. Field of the Disclosure

This technology generally relates to methods and systems for session caching, and more particularly to methods and systems for facilitating automated session data persistence and management via an application programming interface by using a centralized session cache.

2. Background Information

Many business entities provide services for users by utilizing vast application networks. Often, to improve user experience, session data for each application instance must be persisted for efficient retrieval at a later time. Historically, conventional techniques for persisting and managing the session data have resulted in varying degrees of success with respect to ease and effectiveness of implementation.

One drawback of using the conventional techniques is that in many instances, each application in the application network must incorporate complex software codes to persist and manage the session data. As a result, large investments of developer resources are required for custom code solutions. Additionally, there is no common platform to manage the persisted session data due to variations in the custom code solutions of each application.

Therefore, there is a need for a reusable plug-and-play solution that utilizes a centralized session cache to facilitate automated session data persistence and management via an application programming interface.

SUMMARY

The present disclosure, through one or more of its various aspects, embodiments, and/or specific features or sub-components, provides, inter alia, various systems, servers, devices, methods, media, programs, and platforms for facilitating automated session data persistence and management via an application programming interface by using a centralized session cache.

According to an aspect of the present disclosure, a method for facilitating session data persistence and management is disclosed. The method is implemented by at least one processor. The method may include receiving a first indication from an application, the first indication may relate to an initiation of a first session; compiling session data from the application, the session data may relate to a state of the application; receiving a termination indication from the application, the termination indication may relate to a termination of the first session; persisting, in a session cache, the session data based on the termination indication; receiving a second indication from the application, the second indication may relate to an initiation of a second session; identifying the corresponding session data in the session cache by using the second indication; and automatically injecting the identified session data into the application.

In accordance with an exemplary embodiment, the first indication and the second indication may include information that corresponds to the application, the information may include at least one from among an application identifier and a user identifier.

In accordance with an exemplary embodiment, the first session and the second session may include at least one from among a user session and an application session, the first session and the second session may relate to an interactive information interchange between at least two communicating devices.

In accordance with an exemplary embodiment, the session data may be associated with an identifier prior to persistence in the session cache, the identifier may relate to at least one from among an application identifier and a user identifier.

In accordance with an exemplary embodiment, the session cache may include a centralized data storage repository that enables replication of the session data for each instance of the application across different regions.

In accordance with an exemplary embodiment, to compile the session data, the method may further include identifying a data stream that corresponds to the application based on the first indication; extracting the session data from the identified data stream; and compiling the session data.

In accordance with an exemplary embodiment, prior to receiving the first indication from the application, a load balancer may be utilized to distribute application traffic that corresponds to the application across a plurality of servers, the load balancer may automatically identify each instance of the application.

In accordance with an exemplary embodiment, data from the application may be received via an application programming interface, the data may include information that relates to at least one from among the first indication, the termination indication, and the second indication.

In accordance with an exemplary embodiment, the application may be bound to the session cache, binding the application may correspond to a mapping of the application to a target platform that relates to the session cache.

In accordance with an exemplary embodiment, the application may include at least one from among a web application, a monolithic application, and a microservice application.

According to an aspect of the present disclosure, a computing device configured to implement an execution of a method for facilitating session data persistence and management is disclosed. The computing device comprising a processor; a memory; and a communication interface coupled to each of the processor and the memory, wherein the processor may be configured to receive a first indication from an application, the first indication may relate to an initiation of a first session; compile session data from the application, the session data may relate to a state of the application; receive a termination indication from the application, the termination indication may relate to a termination of the first session; persist, in a session cache, the session data based on the termination indication; receive a second indication from the application, the second indication may relate to an initiation of a second session; identify the corresponding session data in the session cache by using the second indication; and automatically inject the identified session data into the application.

In accordance with an exemplary embodiment, the first indication and the second indication may include information that corresponds to the application, the information may include at least one from among an application identifier and a user identifier.

In accordance with an exemplary embodiment, the first session and the second session may include at least one from among a user session and an application session, the first session and the second session may relate to an interactive information interchange between at least two communicating devices.

In accordance with an exemplary embodiment, the processor may be further configured to associate the session data with an identifier prior to persistence in the session cache, the identifier may relate to at least one from among an application identifier and a user identifier.

In accordance with an exemplary embodiment, the session cache may include a centralized data storage repository that enables replication of the session data for each instance of the application across different regions.

In accordance with an exemplary embodiment, to compile the session data, the processor may be further configured to identify a data stream that corresponds to the application based on the first indication; extract the session data from the identified data stream; and compile the session data.

In accordance with an exemplary embodiment, prior to receiving the first indication from the application, the processor may be further configured to utilize a load balancer to distribute application traffic that corresponds to the application across a plurality of servers, the load balancer may automatically identify each instance of the application.

In accordance with an exemplary embodiment, the processor may be further configured to receive data from the application via an application programming interface, the data may include information that relates to at least one from among the first indication, the termination indication, and the second indication.

In accordance with an exemplary embodiment, the processor may be further configured to bind the application to the session cache, binding the application may correspond to a mapping of the application to a target platform that relates to the session cache.

In accordance with an exemplary embodiment, the application may include at least one from among a web application, a monolithic application, and a microservice application.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
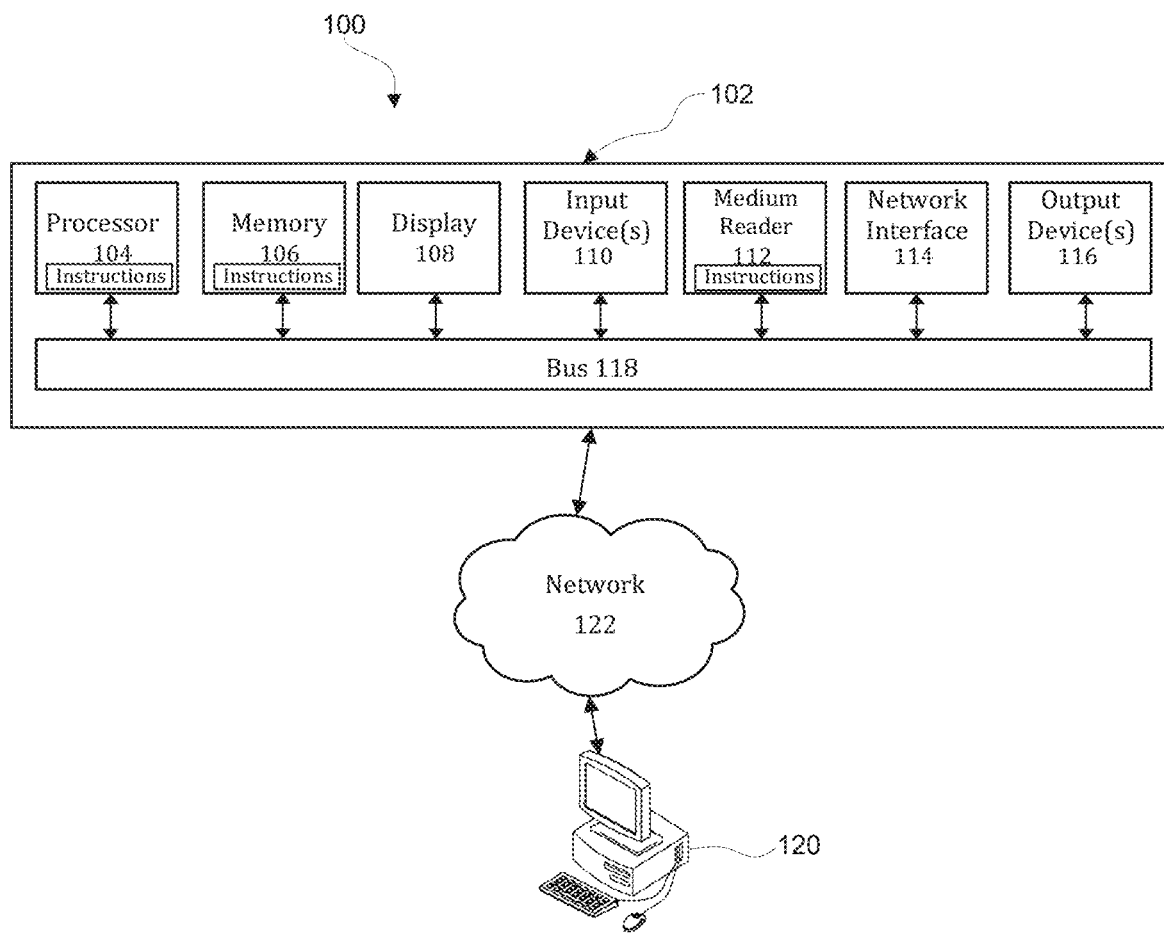
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating automated session data persistence and management via an application programming interface by using a centralized session cache.

Figure 2:
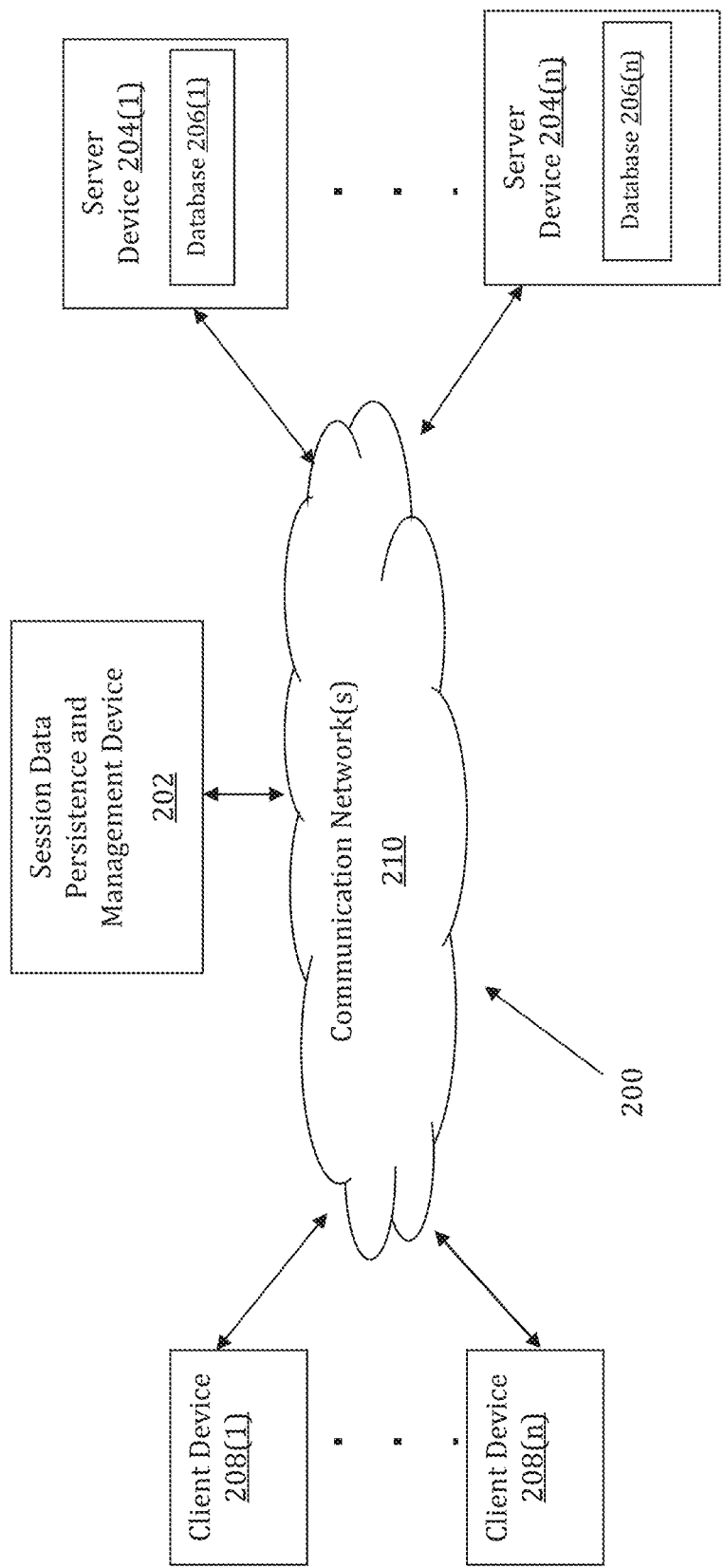
FIG. 2 illustrates an exemplary diagram of a network environment.

Referring to FIG. 2, a schematic of an exemplary network environment 200 for implementing a method for facilitating automated session data persistence and management via an application programming interface by using a centralized session cache is illustrated. In an exemplary embodiment, the method is executable on any networked computer platform, such as, for example, a personal computer (PC).

The method for facilitating automated session data persistence and management via an application programming interface by using a centralized session cache may be implemented by a Session Data Persistence and Management (SDPM) device 202. The SDPM device 202 may be the same or similar to the computer system 102 as described with respect to FIG. 1. The SDPM device 202 may store one or more applications that can include executable instructions that, when executed by the SDPM device 202, cause the SDPM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SDPM device 202 itself, may be located in virtual server(s) running in a cloud-based computing environment rather than being tied to one or more specific physical network computing devices. Also, the application(s) may be running in one or more virtual machines (VMs) executing on the SDPM device 202. Additionally, in one or more embodiments of this technology, virtual machine(s) running on the SDPM device 202 may be managed or supervised by a hypervisor.

In the network environment 200 of FIG. 2, the SDPM device 202 is coupled to a plurality of server devices 204(1)-204(n) that hosts a plurality of databases 206(1)-206(n), and also to a plurality of client devices 208(1)-208(n) via communication network(s) 210. A communication interface of the SDPM device 202, such as the network interface 114 of the computer system 102 of FIG. 1, operatively couples and communicates between the SDPM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SDPM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and SDPM devices that efficiently implement a method for facilitating automated session data persistence and management via an application programming interface by using a centralized session cache.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SDPM device 202 may be a standalone device or integrated with one or more other devices or apparatuses, such as one or more of the server devices 204(1)-204(n), for example. In one particular example, the SDPM device 202 may include or be hosted by one of the server devices 204(1)-204(n), and other arrangements are also possible. Moreover, one or more of the devices of the SDPM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SDPM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to first indications, first session data, application state data, termination indications, second indications, second session data, application identifiers, and user identifiers.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the SDPM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the SDPM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the SDPM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SDPM device 202, the server devices 204(1)-204(n), or the client devices 208(1)-208(n), for example, may be configured to operate as virtual instances on the same physical machine. In other words, one or more of the SDPM device 202, the server devices 204(1)-204(n), or the client devices 208(1)-208(n) may operate on the same physical device rather than as separate devices communicating through communication network(s) 210. Additionally, there may be more or fewer SDPM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
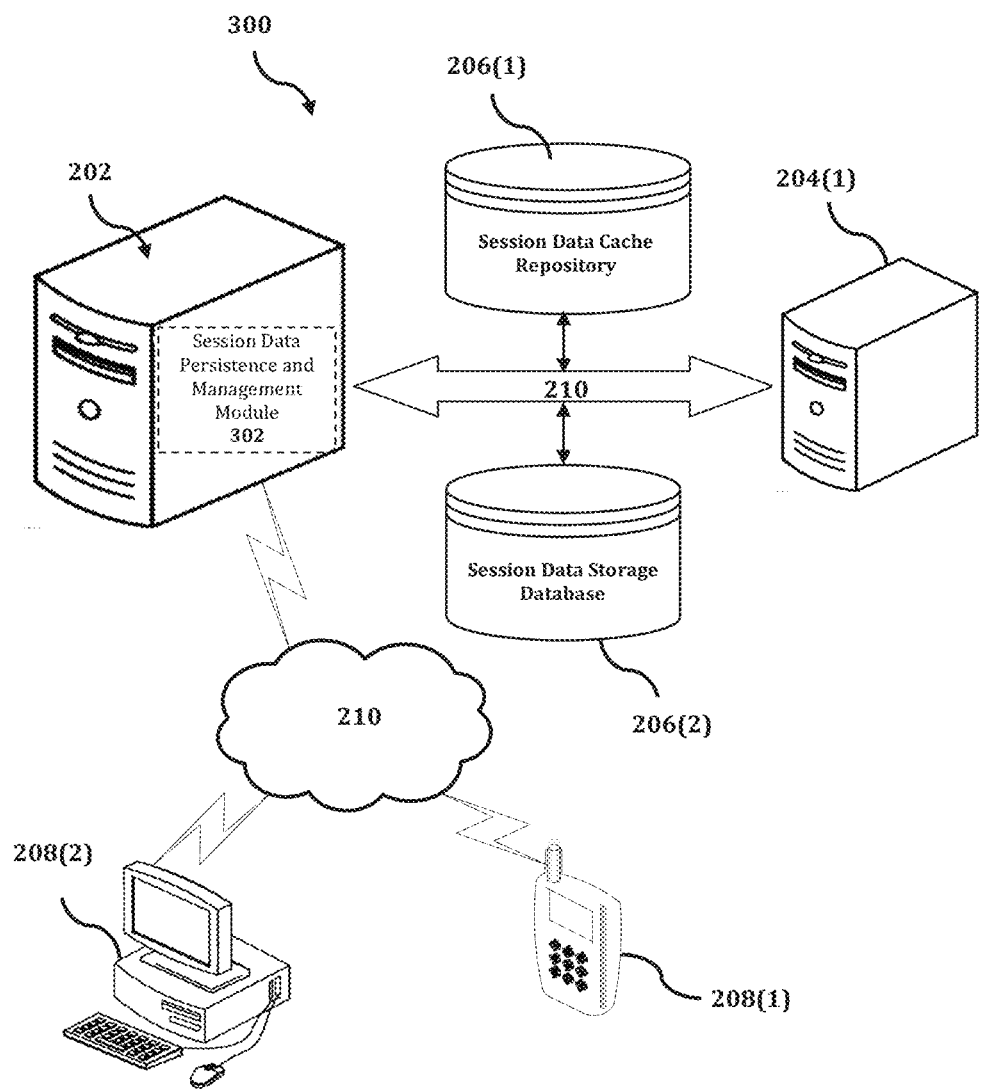
FIG. 3 shows an exemplary system for implementing a method for facilitating automated session data persistence and management via an application programming interface by using a centralized session cache.

The SDPM device 202 is described and shown in FIG. 3 as including a session data persistence and management module 302, although it may include other rules, policies, modules, databases, or applications, for example. As will be described below, the session data persistence and management module 302 is configured to implement a method for facilitating automated session data persistence and management via an application programming interface by using a centralized session cache.

An exemplary process 300 for implementing a mechanism for facilitating automated session data persistence and management via an application programming interface by using a centralized session cache by utilizing the network environment of FIG. 2 is shown as being executed in FIG. 3. Specifically, a first client device 208(1) and a second client device 208(2) are illustrated as being in communication with SDPM device 202. In this regard, the first client device 208(1) and the second client device 208(2) may be "clients" of the SDPM device 202 and are described herein as such. Nevertheless, it is to be known and understood that the first client device 208(1) and/or the second client device 208(2) need not necessarily be "clients" of the SDPM device 202, or any entity described in association therewith herein. Any additional or alternative relationship may exist between either or both of the first client device 208(1) and the second client device 208(2) and the SDPM device 202, or no relationship may exist.

Further, SDPM device 202 is illustrated as being able to access a session data cache repository 206(1) and a session data storage database 206(2). The session data persistence and management module 302 may be configured to access these databases for implementing a method for facilitating automated session data persistence and management via an application programming interface by using a centralized session cache.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the SDPM device 202 via broadband or cellular communication. Of course, these embodiments are merely exemplary and are not limiting or exhaustive.

Upon being started, the session data persistence and management module 302 executes a process for facilitating automated session data persistence and management via an application programming interface by using a centralized session cache. An exemplary process for facilitating automated session data persistence and management via an application programming interface by using a centralized session cache is generally indicated at flowchart 400 in FIG. 4.

Figure 4:
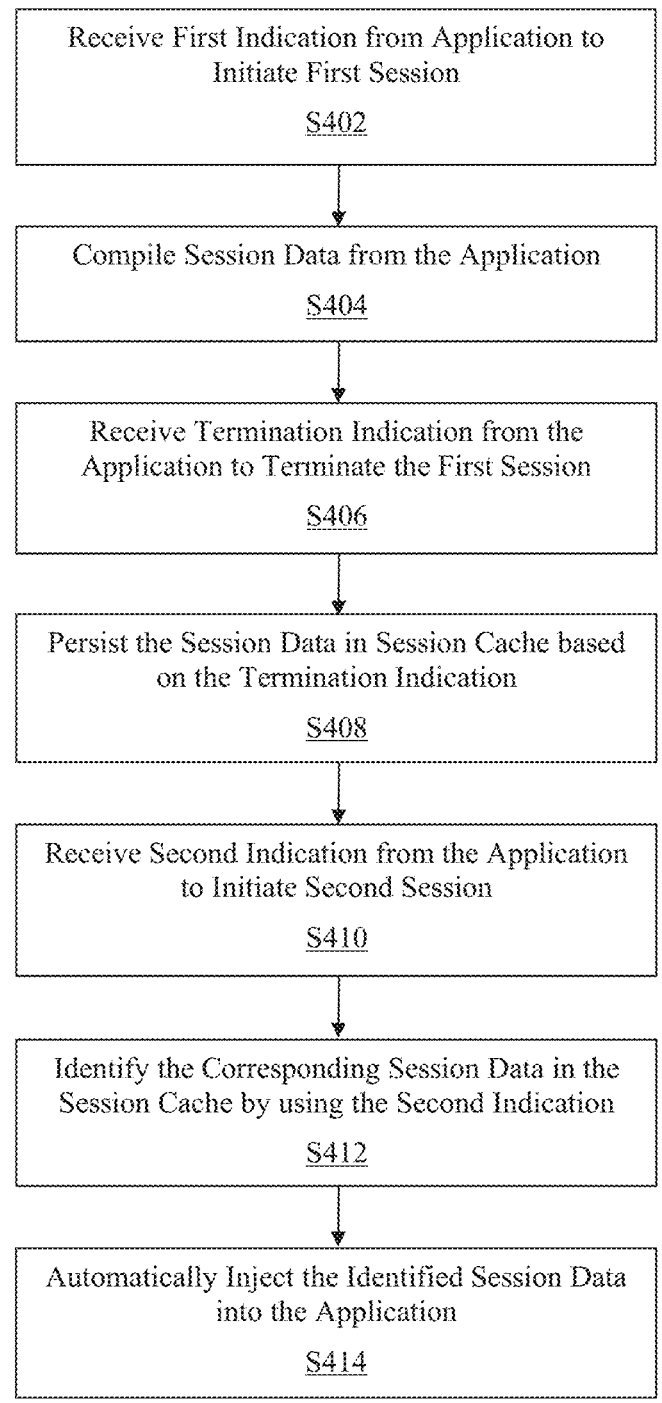
FIG. 4 is a flowchart of an exemplary process for implementing a method for facilitating automated session data persistence and management via an application programming interface by using a centralized session cache.

In the process 400 of FIG. 4, at step S402, a first indication may be received from an application. The first indication may relate to an initiation of a first session. In an exemplary embodiment, the first indication may include information that corresponds to the application. The information may include at least one from among an application identifier and a user identifier. For example, when the application has been initiated, a data packet may be received from the application as an indication. In another exemplary embodiment, the application may be bound to the disclosed invention. Binding of the application may correspond to a mapping of the application to a target platform to ensure proper communication.

In another exemplary embodiment, the first session may include at least one from among a user session and an application session. The first session may relate to an interactive information interchange between at least two communicating devices. For example, the first session may correspond to an interaction between a user device and the application. In another exemplary embodiment, the user session may relate to a period of time a specific user interfaces with an application. The user session begins when the specific user accesses the application and ends when the interaction is terminated by the specific user. In another exemplary embodiment, the application session may relate to a period of time at least one user interfaces with an application. The application session begins when at least one user accesses the application and ends when the interaction is terminated by the last interacting user.

In another exemplary embodiment, data from the application may be received via an application programming interface (API). The data may include information that relates to the first indication. Consistent with present disclosures, the data may be received from the application via an API that is associated with the disclosed invention. The binding of the application to the disclosed invention may facilitate the data transfer via the API. In another exemplary embodiment, prior to receiving the first indication from the application, a load balancer may be utilized to distribute application traffic that corresponds to the application across a plurality of servers. The load balancer may automatically identify each instance of the application.

In another exemplary embodiment, the application may include at least one from among a web application, a monolithic application, and a microservice application. The monolithic application may describe a single-tiered software application where the user interface and data access code are combined into a single program from a single platform. The monolithic application may be self-contained and independent from other computing applications.

In another exemplary embodiment, the web application may correspond to application software that runs on a web server. Unlike computer-based software programs that run locally on the operating system of a device, the web application may be accessed by the user through a web browser with an active network connection. The web application may be programmed by using a client-server modeled structure wherein the user is provided services via an off-site server. The off-site server may include first-party off-site servers as well as third-party off-site servers.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S404, session data may be compiled from the application. The session data may relate to a state of the application. In an exemplary embodiment, the application state may relate to a state at which an application resides with regards to a stage of execution and a memory that is stored for the application. The application state may represent the totality of data necessary for the execution of the application.

In another exemplary embodiment, to compile the session data, a data stream that corresponds to the application may be identified based on the first indication. Consistent with present disclosures, the first indication may include an identifier that is usable to identify the data stream that corresponds to the application. The session data may then be extracted from the identified data stream and compiled. In another exemplary embodiment, the session data may be associated with the identifier. The identifier may relate to at least one from among an application identifier and a user identifier. As will be appreciated by a person of ordinary skill in the art, by extracting the session data from the data stream, the session data may be compiled without implementing custom software code solutions in the application.

At step S406, a termination indication may be received from the application. The termination indication may relate to a termination of the first session. In an exemplary embodiment, the termination indication may include information that corresponds to an action to terminate the first session. The information may include at least one from among a termination request and a system status corresponding to the application. In another exemplary embodiment, a termination characteristic may be determined based on the termination indication. For example, the termination request from the user may indicate that the user has initiated a termination of the first session. Similarly, the system status corresponding to the application may indicate a system limitation that resulted in the termination of the first session.

In another exemplary embodiment, data from the application may be received via an application programming interface (API). The data may include information that relates to the termination indication. Consistent with present disclosures, the data may be received from the application via an API that is associated with the disclosed invention. The binding of the application to the disclosed invention may facilitate the data transfer via the API.

At step S408, the session data may be persisted in a session cache based on the termination indication. In an exemplary embodiment, the session cache may include a centralized data storage repository that enables replication of the session data for each instance of the application across different regions. The centralized data storage repository may facilitate the termination of a session in one region and resuming of the session in another region. For example, a user in region A may terminate a session prior to boarding a plane and seamlessly resume the session upon landing in region B.

In another exemplary embodiment, the session data may be persisted in hardware and/or software components that stores data so that future requests for the data may be retrieved faster. For example, the session data may be temporarily persisted geographically close to the application to facilitate quick retrieval. In another exemplary embodiment, the session data may be persisted more permanently in a data storage database.

At step S410, a second indication may be received from the application. The second indication may relate to an initiation of a second session. In an exemplary embodiment, the second session may relate to the first session. The second session may relate to a continuation of an action that was initiated in the first session. For example, the user may continue a bill payment process from the first session in the second session. In another exemplary embodiment, the second session may relate to a continuation of an interaction that was initiated in the first session. For example, in the second session, the user may continue a service process via a chat that was initiated in the first session. As will be appreciated by a person of ordinary skill in the art, the present disclosure may apply to a third session as well as all subsequent sessions.

In another exemplary embodiment, the second indication may include information that corresponds to the application. The information may include at least one from among an application identifier and a user identifier. For example, when the application has been reinitiated, a data packet may be received from the application as a second indication.

In another exemplary embodiment, the second session may include at least one from among a user session and an application session. The second session may relate to an interactive information interchange between at least two communicating devices. For example, the second session may correspond to an interaction between a user device and the application. In another exemplary embodiment, the user session may relate to a period of time a specific user interfaces with an application. The user session begins when the specific user accesses the application and ends when the interaction is terminated by the specific user. In another exemplary embodiment, the application session may relate to a period of time at least one user interfaces with an application. The application session begins when at least one user accesses the application and ends when the interaction is terminated by the last interacting user.

In another exemplary embodiment, data from the application may be received via an application programming interface (API). The data may include information that relates to the second indication. Consistent with present disclosures, the data may be received from the application via an API that is associated with the disclosed invention. The binding of the application to the disclosed invention may facilitate the data transfer via the API.

At step S412, the session data that corresponds to the application may be identified in the session cache by using the second indication. In an exemplary embodiment, an identifier that relates to the application may be extracted from the second indication. Consistent with present disclosures, the identifier may be compared to a session data identifier that is associated with the session data.

At step S414, the identified session data may be automatically injected into the application. In an exemplary embodiment, the identified session data may be automatically injected into each instance of the application based on the second indication. The injected data may enable the application to seamlessly resume a user-initiated interaction and/or a user-initiated action from the first session.

Figure 5:
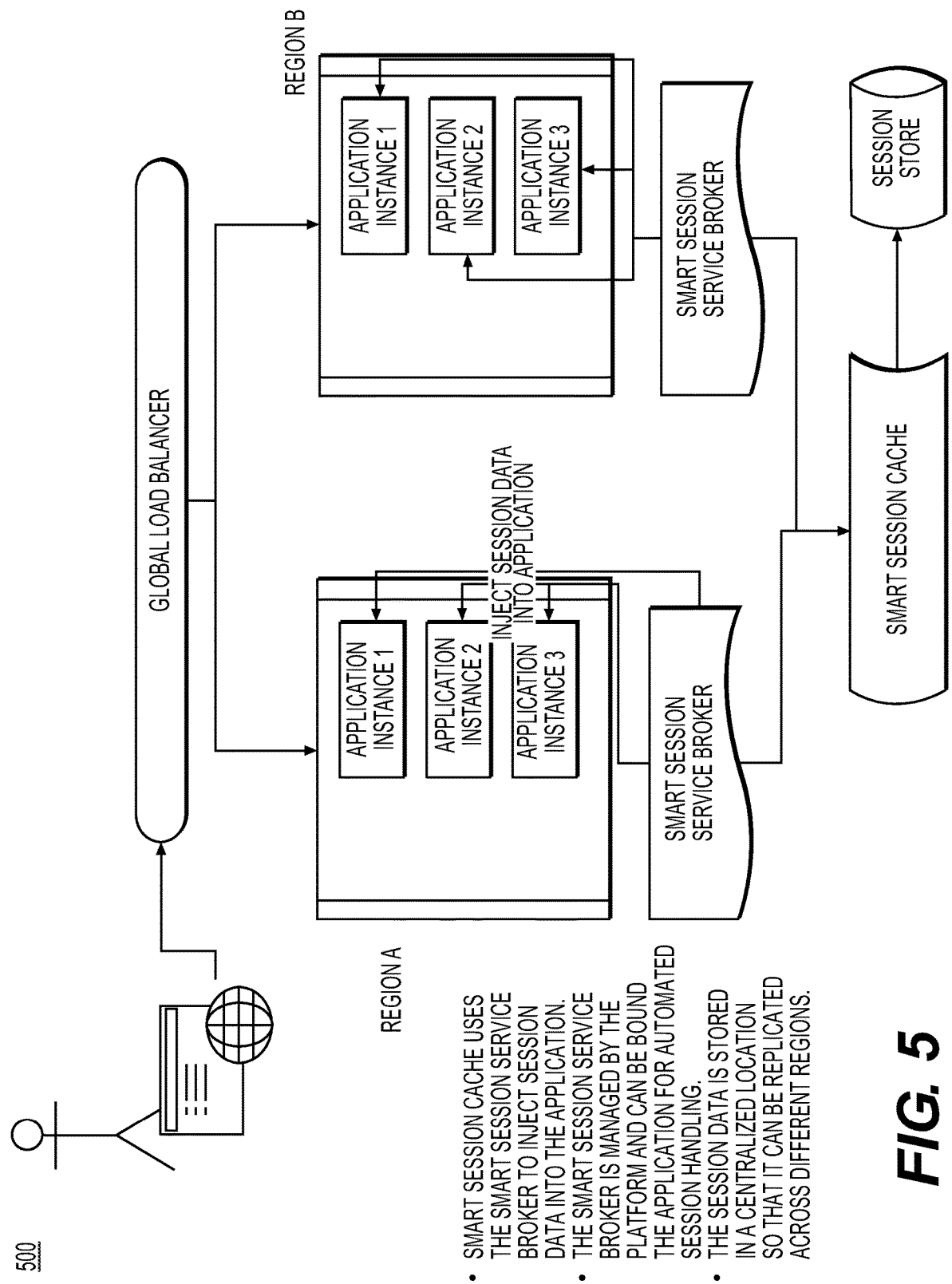
FIG. 5 is a flow diagram of an exemplary process for implementing a method for facilitating automated session data persistence and management via an application programming interface by using a centralized session cache.

FIG. 5 is a flow diagram 500 of an exemplary process for implementing a method for facilitating automated session data persistence and management via an application programming interface by using a centralized session cache. In FIG. 5, session data may be persisted and automatically managed to improve user experience.

As illustrated in FIG. 5, a user may interact with an application to initiate a session. A global load balancer may be utilized to distribute application traffic that corresponds to the application across a plurality of servers. The load balancer may automatically identify each instance of the application. The distributed application traffic may relate to various instances of the application in different regions such as, for example, in region A and in Region B. In FIG. 5, a smart session cache may use a smart session service broker to inject session data into the application. The smart session service broker may be managed by the claimed platform and may be bound to the application for automated session handling. The session data may be stored in a centralized location such as, for example, a session store so that the session data may be replicated across different regions.

Accordingly, with this technology, an optimized process for facilitating automated session data persistence and management via an application programming interface by using a centralized session cache is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating session data persistence and management, the method being implemented by at least one processor, the method comprising:
    binding, by the at least one processor, an application to a target platform by,
        mapping, by the at least one processor, the application to the target platform to ensure communication of at least one data packet between the application and the target platform,
        wherein the target platform includes a session service broker for automated session handling;
    receiving, by the at least one processor, a first indication from the application, the first indication relating to an initiation of a first session by the application from a first geographic region among a plurality of different geographic regions greater than two, each of the plurality of different geographic regions including at least one server,
        wherein the application corresponds to at least one from among an event producer and an event consumer in a coupled choreography of a distributed data streaming platform;
    automatically distributing, by a global load balancer, application traffic that corresponds to the application across a plurality of servers residing across the plurality of different geographic regions, the application traffic relating to a plurality of instances of the application in the plurality of different geographic regions;
    automatically identifying, by the global load balancer, each instance of the application among the plurality of instances of the application;
    compiling, by the at least one processor, session data from the application, the session data relating to a state of the application,
        wherein the state includes a stage of execution of the application and represent totality of data necessary for the execution of the application;
    receiving, by the at least one processor, a termination indication from the application, the termination indication relating to a termination of the first session;
    determining, by the at least one processor, a termination characteristic for the application based on the termination indication, the termination characteristic relating to a cause of the termination of the first session,
        wherein the termination indication includes termination data that corresponds to an action to terminate the first session; and wherein the termination characteristic is determined for the application via a peer-to-peer network environment;
persisting, by the at least one processor in a session cache, the session data based on the termination indication, wherein the session data is temporarily persisted within geographic proximity to the application; and
wherein the session data is permanently persisted in a data storage database that is distributed across a plurality of distinct network computing devices;
receiving, by the at least one processor, a second indication from the application, the second indication relating to an initiation of a second session at a later time, wherein the second session includes a continuation of a service process via a chat interface, and
wherein the second session is configured to be accessible from a second geographic region among the plurality of different geographic regions different from the first region;
identifying, by the at least one processor, the corresponding session data in the session cache by using the second indication; and
automatically injecting, by the at least one processor, the identified session data into each instance of the application among the plurality of instances of the application in the plurality of different geographic regions based on the second indication by using the session service broker for accessing the identified session data from any region among the plurality of different geographic regions.

2. The method of claim 1, wherein the first indication and the second indication include information that corresponds to the application, the information including at least one from among an application identifier and a user identifier.

3. The method of claim 1, wherein the first session and the second session include at least one from among a user session and an application session, the first session and the second session relating to an interactive information interchange between at least two communicating devices.

4. The method of claim 1, wherein the session data is associated with an identifier prior to persistence in the session cache, the identifier relating to at least one from among an application identifier and a user identifier.

5. The method of claim 1, wherein the session cache includes a centralized data storage repository that enables replication of the session data for the each instance of the application.

6. The method of claim 1, wherein compiling the session data further comprises:
identifying, by the at least one processor, a data stream that corresponds to the application based on the first indication;
extracting, by the at least one processor, the session data from the identified data stream; and
compiling, by the at least one processor, the session data.

7. The method of claim 1, wherein data from the application is received via an application programming interface, the data including information that relates to at least one from among the first indication, the termination indication, and the second indication.

8. The method of claim 1, wherein the application is bound to the session cache, binding the application corresponding to the mapping of the application to the target platform that relates to the session cache.

9. The method of claim 1, wherein the application includes at least one from among a web application, a monolithic application, and a microservice application.

10. A plurality of computing devices configured to implement an execution of a method for facilitating session data persistence and management, each of the plurality of computing devices comprising:
a processor;
a memory; and
a communication interface coupled to each of the processor and the memory,
wherein the processor is configured to:
bind an application to a target platform by further configuring the processor to:
map the application to the target platform to ensure communication of at least one data packet between the application and the target platform, wherein the target platform includes a session service broker for automated session handling;
receive a first indication from the application, the first indication relating to an initiation of a first session by the application from a first geographic region among a plurality of different geographic regions greater than two, each of the plurality of different geographic regions including at least one server,
wherein the application corresponds to at least one from among an event producer and an event consumer in a coupled choreography of a distributed data streaming platform;
automatically distribute, via a global load balancer, application traffic that corresponds to the application across a plurality of servers residing across the plurality of different geographic regions, the application traffic relating to a plurality of instances of the application in the plurality of different geographic regions;
automatically identify, via the global load balancer, each instance of the application among the plurality of instances of the application;
compile session data from the application, the session data relating to a state of the application,
wherein the state includes a stage of execution of the application and represent totality of data necessary for the execution of the application;
receive a termination indication from the application, the termination indication relating to a termination of the first session;
determine a termination characteristic for the application based on the termination indication, the termination characteristic relating to a cause of the termination of the first session,
wherein the termination indication includes termination data that corresponds to an action to terminate the first session; and
wherein the termination characteristic is determined for the application via a peer-to-peer network environment;
persist, in a session cache, the session data based on the termination indication,
wherein the session data is temporarily persisted within geographic proximity to the application; and
wherein the session data is permanently persisted in a data storage database that is distributed across the plurality of computing devices;
receive a second indication from the application, the second indication relating to an initiation of a second session at a later time,
wherein the second session includes a continuation of a service process via a chat interface, and wherein the second session is configured to be accessible from a second geographic region among the plurality of different geographic regions different from the first region;

identify the corresponding session data in the session cache by using the second indication; and automatically inject the identified session data into each instance of the application among the plurality of instances of the application in the plurality of different geographic regions based on the second indication by using the session service broker for accessing the identified session data from any region among the plurality of different geographic regions.

11. The plurality of computing devices of claim 10, wherein the first indication and the second indication include information that corresponds to the application, the information including at least one from among an application identifier and a user identifier.

12. The plurality of computing devices of claim 10, wherein the first session and the second session include at least one from among a user session and an application session, the first session and the second session relating to an interactive information interchange between at least two communicating devices.

13. The plurality of computing devices of claim 10, wherein the processor is further configured to associate the session data with an identifier prior to persistence in the session cache, the identifier relating to at least one from among an application identifier and a user identifier.

14. The plurality of computing devices of claim 10, wherein the session cache includes a centralized data storage repository that enables replication of the session data for the each instance of the application.

15. The plurality of computing devices of claim 10, wherein, to compile the session data, the processor is further configured to:

identify a data stream that corresponds to the application based on the first indication;

extract the session data from the identified data stream; and compile the session data.

16. The plurality of computing devices of claim 10, wherein the processor is further configured to receive data from the application via an application programming interface, the data including information that relates to at least one from among the first indication, the termination indication, and the second indication.

17. The plurality of computing devices of claim 10, wherein the processor is further configured to bind the application to the session cache, binding the application corresponding to the mapping of the application to the target platform that relates to the session cache.

18. The plurality of computing devices of claim 10, wherein the application includes at least one from among a web application, a monolithic application, and a microservice application.

* * * * *